Figure 1:
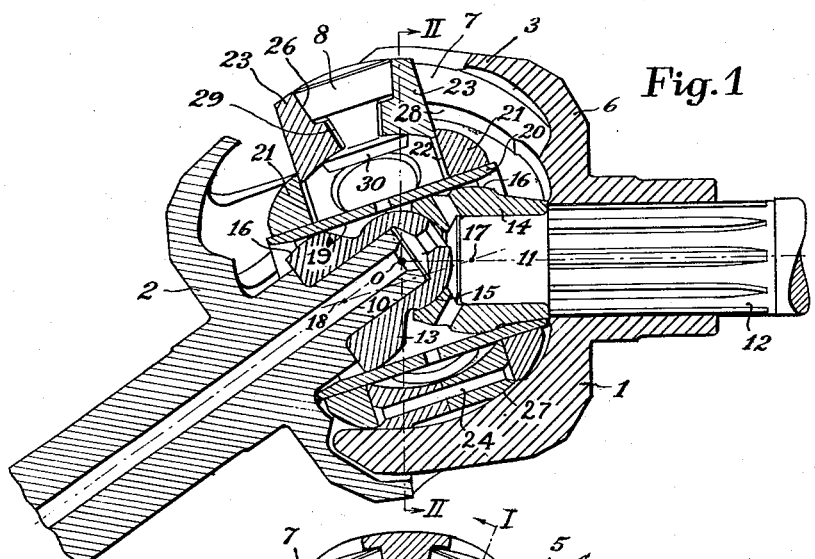

Dec. 5, 1950   S. G. WINGQUIST   2,532,434
UNIVERSAL JOINT

Filed July 17, 1947   2 Sheets-Sheet 1

Inventor
S. G. Wingquist
By Clarence Downing Supple
Attys.

Patented Dec. 5, 1950

2,532,434

UNITED STATES PATENT OFFICE 2,532,434

UNIVERSAL JOINT

Sven Gustaf Wingquist, Goteborg, Sweden

Application July 17, 1947, Serial No. 761,526
In Sweden August 9, 1946

1 Claim. (Cl. 64—21)

The invention relates to universal joints, particularly joints of the type comprising a driving and a driven joint member, each having arms provided with races between which are interposed rollers for transmitting motion between the joint members.

Universal joints for small angles of deflection may be made with short arms having sufficient strength for taking up the load applied. If, however, the joint is to be used for greater angles of deflection, say 30° or more, the arms have to be made longer and then it may be difficult to make the arms sufficiently strong if the size of the joint is to be kept within reasonable limits. Even if the number of arms on each joint member is limited to two and rollers of small diameter are used so that the width of the arms in a peripheral direction can be made as great as possible the arms are subjected to very considerable stresses. These stresses are not only bending but also torsional stresses as the direction in which the load is applied (through the rollers) is tangential to the arm.

The invention has for its object to eliminate or reduce these torsional stresses; a further object is to make it possible to use a greater number of arms. For this purpose the arms are made substantially T-shaped in cross-section so as to have a radial portion which is directed inwards and a transverse portion which extends in a peripheral direction. The sides of the radial portion form the races and the transverse portion increases in a peripheral direction towards the base of the arm where it merges into the corresponding portions of the other arms and the hub part of the joint member.

When the joint is rotating pressure is exerted on the races. If the shafts of the joint are in line with each other the resulting forces will be applied to the centre of the race.

The arms are symmetrical in respect of a central axial plane. The resulting force acting on the race is at right angles to the surface of the race and the extension thereof passes through the central plane at a distance from the axis of the joint which must be greater than the radial distance from the same axis to the centre of the race. By placing the two races on the same arm near each other and thus also near the central plane of the arm, the resulting force acting on the race will be nearly at right angles to the central plane and it will cut the central plane at a distance from the axis of the joint which is very little greater than the distance from the same axis to the centre of the race. If in a given section the resulting force intersects the central plane at the same distance from the axis of the joint as the torsional centre of the arm then in this section no torsional stresses will occur. If the two distances are not the same then a torsional stress will be set up the magnitude of which is determined by the resulting force and the difference between the two radial distances referred to. There will also be bending stresses acting on the arm.

It is thus possible to relieve a certain part of the arm which is subjected to heavy bending stresses from torsional stresses. It is also possible to relieve the arm along the whole length thereof or along a part of the length thereof from torsional stresses. In order to strike a balance and to increase the resistance of the arm to bending stresses the cross section of the arm, as already stated, is increased by a portion having the shape of a circle sector and increasing in a peripheral direction towards the base of the arm so as to be able to take up the bending stress caused by the resulting force acting on the race. The arm should preferably also be so constructed that for each section thereof the centre of torsion is substantially at the same radial distance from the axis of the joint as the distance from the same axis to the point where the resulting force acting on the race intersects the central axial plane of the arm. A section through the arm therefore will have the shape of a T, and in different sections of the arm the transverse part of the T will increase towards the base of the arm. If properly carried out, the arm in all sections is subjected only to bending stresses, or essentially so, and the dangerous torsional stress has been eliminated, or essentially so. The positioning of the races near the central axial plane of the arm makes it possible to use rollers of large diameter and still provide each joint member with more arms than two, so that the load is well equalized.

Figure 2:
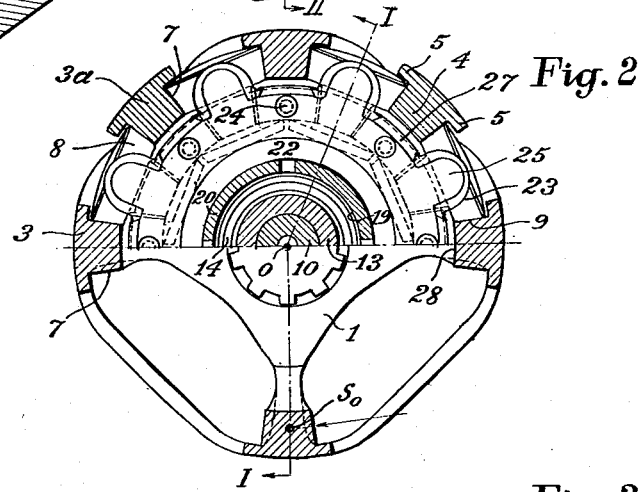
Figure 3:
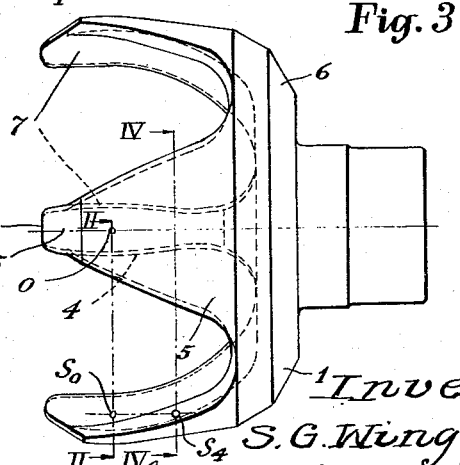

One embodiment of the invention in which each joint member has four arms is shown in the accompanying drawing. Fig. 1 shows an axial section on line I—I in Fig. 2. In Fig. 2 the upper half shows a radial section on line II—II in Fig. 1, the shafts of the joint members being assumed to be in line with each other, and the lower half shows a similar section through only one of the joint members. Fig. 3 shows a side view of one of the joint members and Fig. 4 a section on line IV—IV in Fig. 3. Fig. 5 shows the joint mounted in an articulated casing.

In the drawings 1 denotes the driving and 2 the driven joint member, each having in section T-shaped arms 3 and 3a respectively. 4 denotes the radial portion of the T which is directed inwards and 5 the transverse portion which extends in a peripheral direction. As will appear particularly from Fig. 3 the portion 5 increases in a peripheral direction towards the base of the arm where the portions 5 merge into one another and the hub portion 6 of the joint member. The portion 4 on both sides has races 7, and the insides 28 of the arms form a sphere 28 the centre of which coincides with the centre of deflection O of the joint. Between the races are interposed rollers 8 having conical roll faces in contact with the races 7.

In order to guide the rollers in the bisector plane of the joint the following means are provided.

The joint member 2 is formed with an axially directed member 10, and a corresponding member 11 is provided on a shaft 12 mounted in the joint member 1. On the members 10 and 11 are mounted guiding members 13 and 14 having interengaging spherical faces 15. The guide members 13, 14 also have spherical surfaces 16, the centres of which are on the axes of the joint members, symmetrical relatively to the centre O of the joint. On the spherical surfaces 16 fits the inner cylindrical surface 19 of a bisecting member which consists of a tube 20 and two rings 21. The rings are secured to the tube and have opposed plane surfaces 22. In the bisecting member 20, 21 is slidably mounted a roll holder consisting of two rings 23 held together by means of rivets 24. At all angles of deflection of the joint members the roll holder takes up a position in which the central plane thereof is at right angles to the axis of the bisecting member and passes through the centre O of the joint. Owing to the symmetrical position of the bisecting member relatively to the centres 17, 18, the bisecting member for each angle of deflection of the shafts of the joint always deviates by half that angle from the normal position, and therefore the roll holder will always be guided in the plane bisecting the axes of the joint members and thus also guide the rollers in the same plane. When the joint members are angularly deflected the roll holder turns about the centre O, in the plane of the paper in Fig. 1, whereas the bisecting member is displaced in such manner that the central axis thereof no longer passes through the centre O.

The roll holder has radially directed portions 25 which are of semicircular shape and on the inside have surfaces 26 between which the rollers are disposed and by whom they are guided. Between the portions 25 the roll holder has portions 27 which are spherical in respect of the centre O of the joint and which engage with the inner spherical surfaces of the arms 3, 3a.

The bisecting member 20, 21, the roll holder 23 and the rollers 8 form a unitary assembly to facilitate the taking apart and putting together of the joint. For this purpose the rollers are rotatably but non-looseably mounted in the roll holder which is slidably but non-looseably connected with the bisecting member. For this purpose the rollers have recessed portions 29 and inside of these collars 30 engaging with the spherical inner surface of the roll holder. The collars prevent the rollers from falling out and also take up the forces acting on the rollers in the axial direction thereof.

Figure 4:
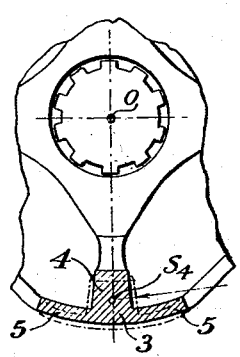
Figure 5:
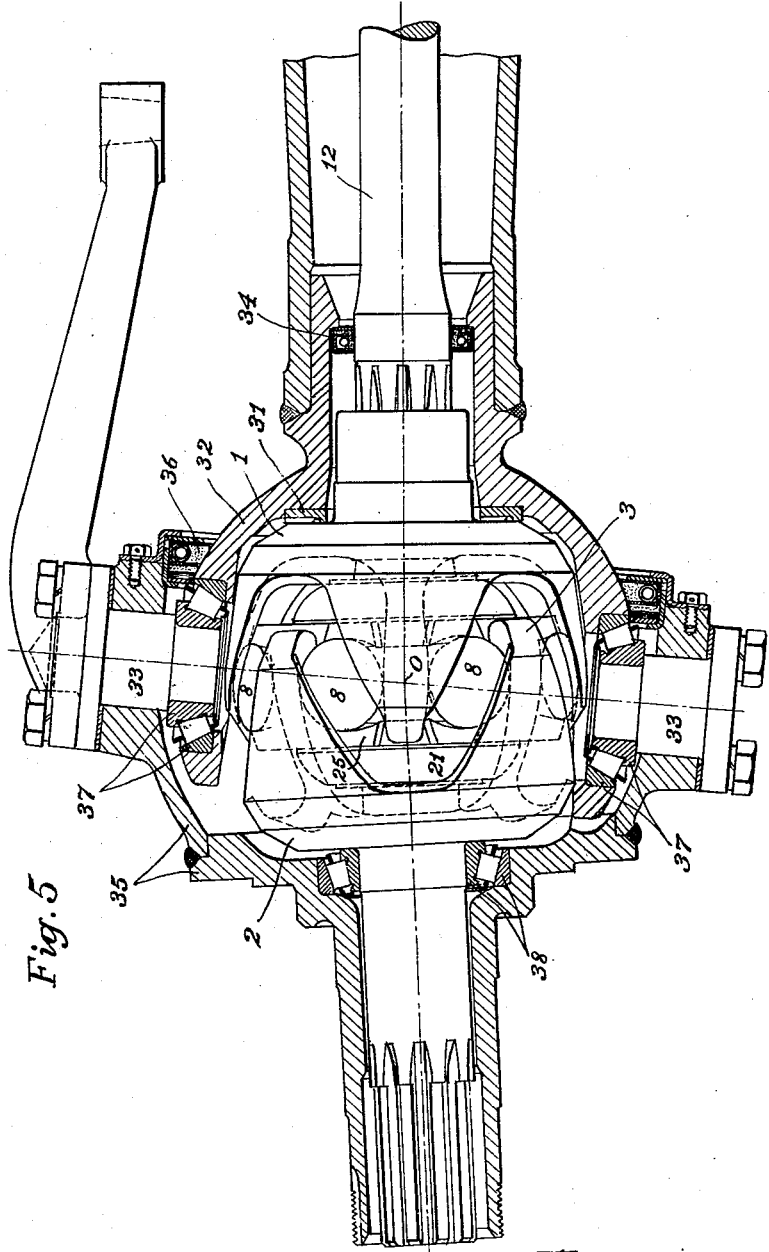

The construction of the arms is shown in detail in the lower half of Fig. 2 and in Figs. 3 and 4. In Fig. 2 the arrow indicates the resulting force (exerted by the roller) acting on the race. Fig. 4 shows a section further in on the arm on line IV—IV in Fig. 3; the figure also shows in dash and dot lines the cut away portion of the arm and the resulting force acting on that portion. The centre of torsion $S_4$ for the section shown in Fig. 4 is in such a position that the arrow would pass through it, i. e., the resulting force intersects the central plane of the arm in a point at the same distance from the axis of the joint member as the distance of the centre of torsion $S_4$ from the same axis. This result is achieved by properly choosing the outer radius of the transverse part 5 as well as the width thereof in a peripheral direction, for the particular section shown. In this way the section $S_4$ is prevented from having torsional stresses added to the bending stresses. If in this section the bending stresses reach their maximum, so that the section is critical in this respect, then it is obviously of advantage to have the section relieved of torsional stresses.

The centre of torsion of the section in the middle of the race is denoted by $S_0$. If this centre of torsion is so located that the resulting force passes through the same, as shown in Fig. 2, then there are no torsional stresses in this section either. By properly dimensioning the arm the torsional centres of all sections between the lines II—II and IV—IV may be located to a substantially straight line between $S_0$ and $S_4$ parallel with the axis of the joint members. In this way, for this part of the arm torsional stresses are avoided and only bending stresses have to be reckoned with.

Axial pressure on the joint is taken up by the joint members 1 and 2 as a result of their spherical inner surfaces engaging with the outer spherical surfaces 27 of the roll holder. Axial pull on the other hand is taken up by the casing in which the joint is mounted. Fig. 5 shows the joint mounted in an articulated casing. The thrust of joint member 1 is taken up by a washer 31 provided in the casing member 32. The latter has a spherical outer surface and is provided with roller bearings 37 for the journals 33 and with a sealing member 34 to prevent escape of oil. The thrust of the joint member 2 is taken up by a conical bearing 38 mounted in the casing member 35. The casing member 35 has seats for the journals 33 and is sealed against the casing member 32 by means of a sealing ring 36.

It will be understood that the construction may be modified in various ways. The number of arms may be greater or smaller than that shown. It is not necessary that the rollers, the roll holder and the bisecting member form a unitary assembly. Other means than those shown and described may be used for guiding the rollers in the bisecting plane. It is possible for the rollers to be guided directly by the bisecting member. It is not necessary that the rollers should be guided exactly in the bisecting plane unless the rotation of the shafts is to be strictly uniform.

What I claim is:

Universal joint comprising in combination a driving and a driven joint member, arms on the joint members, each arm in section having an inwardly directed and a peripherally directed portion so as to form a T, the peripherally directed portion increasing in width towards the base of the arm, races on the sides of the said inwardly directed portions of the arms, and rollers between the races for transmitting the motion.

SVEN GUSTAF WINGQUIST.

REFERENCES CITED

The following references are of record in the file of this patent:

UNITED STATES PATENTS

| Number | Name | Date |
|---|---|---|
| 1,868,540 | Myers | July 26, 1932 |
| 1,968,925 | Barish | Aug. 7, 1934 |
| 2,234,296 | Wollner | Mar. 11, 1941 |
| 2,293,717 | Dodge | Aug. 25, 1942 |